United States Patent
Nath et al.

[11] 3,958,034
[45] May 18, 1976

[54] FRACTIONATED EGG YOLK PRODUCT

[75] Inventors: Kaser Rajinder Nath, Ithaca, N.Y.;
  Mark William Newbold, West Chester, Pa.

[73] Assignee: Cornell Research Foundation, Inc., Ithaca, N.Y.

[22] Filed: Feb. 6, 1975

[21] Appl. No.: 547,626

[52] U.S. Cl. .............................. 426/614; 426/490; 426/478
[51] Int. Cl.² ............................................ A23L 1/32
[58] Field of Search .................... 426/614, 478, 490

[56] References Cited
UNITED STATES PATENTS

| | | | |
|---|---|---|---|
| 3,563,765 | 8/1967 | Melnick | 426/614 |
| 3,717,474 | 2/1973 | Fioriti et al. | 426/614 |

*Primary Examiner*—Raymond N. Jones
*Assistant Examiner*—R. A. Yoncoskie
*Attorney, Agent, or Firm*—Theodore C. Wood; Ralph R. Barnard; Lawrence E. Laubscher

[57] ABSTRACT

An egg yolk material which has been fractionated such that major characteristics of the separate fractions $F_1$, $F_2$ and $F_3$ are approximately:

| | Unfractionated Egg Yolk Material | $F_1$ | $F_2$ | $F_3$ |
|---|---|---|---|---|
| Cholesterol (mg. per gr. of sample) | 9.9 | 9.7 | 6.9 | 28 |
| Fat (per cent of total weight of fraction measured) | 36.9 | 41.59 | 34.37 | 23.30 |
| Protein (per cent of total weight of fraction measured) | 17.55 | 13.36 | 20.02 | 26.33 |

4 Claims, No Drawings

FRACTIONATED EGG YOLK PRODUCT

BACKGROUND OF THE INVENTION

The egg is very nutritious and wholesome food. It is also known that egg yolk is one of the richest sources of cholesterol eaten by man. Because of concern in the recent past over the possible involvement of cholesterol in atherosclerosis, and the high level of cholesterol in egg yolk, the consumption of eggs has fallen markedly.

Even though the chicken egg has one of the lowest levels of cholesterol of all the domestic birds, a considerable amount of work has been done in an attempt to reduce the level of cholesterol in the chicken egg. Some have tried to reduce the cholesterol in the yolk by feeding various oils. Others have tried substituting sitoserol for cholesterol in the yolk. The use of drugs to inhibit cholesterol biosynthesis has also been tried. None of these strategies ever proved successful enough to be accepted commercially.

The inability of the researchers to come up with low cholesterol shell eggs gave impetus to substitute the natural yolk with a synthetic yolk-like substance in liquid egg, see for example U.S. Pat. No. 3,840,683 issued Oct. 8, 1974 to Strong et al.

Much data has been published indicating the level of cholesterol in various strains of chickens and avian species, however that data resulted from methods that were not specific for cholesterol but in fact measured cholesterol, related compounds and in some cases even triglycerides. A recent evaluation of the cholesterol level of some species of eggs using a more specific colorimetric test revealed the following data:

| Species | Cholesterol (mg/gm yolk) |
| --- | --- |
| Chicken | 9.9 |
| Bobwhite Quail | 11.0 |
| Araucana | 12.2 |
| Hungarian Partridge | 13.0 |
| Ringneck Pheasant | 13.5 |
| Wild Turkey | 13.7 |
| Turkey | 15.8 |

SUMMARY OF THE INVENTION

In accordance with the principles of this invention egg yolk material (a part or all of one or more wet egg yolks) is fractionated by ultracentrifugation such that three fractions ($F_1$, $F_2$ and $F_3$) are obtained and major characteristics of those fractions are:

|  | Unfractionated Egg Yolk Material | $F_1$ | $F_2$ | $F_3$ |
| --- | --- | --- | --- | --- |
| Cholesterol (mg. per gr. of sample) | 9.9 | 9.7 | 6.9 | 28 |
| Fat (per cent of total weight of fraction tested) | 36.9 | 41.59 | 34.37 | 23.30 |
| Protein (per cent of total weight of fraction tested) | 17.55 | 13.36 | 20.02 | 26.33 |

It is a feature of this invention that the ultracentrifugation is conducted such that the magnitude of centrifugal force, the time during which such forces act upon the egg yolk material and the operating temperature are selected to cause the desired fractionation of the egg yolk material.

DESCRIPTION OF THE PREFERRED EMBODIMENT

The method employed to produce this new egg yolk material includes the following steps:

1. Egg shell is broken and contents removed,
2. Egg yolk is separated from albumen,
3. Egg yolk is centrifuged until three fractions are obtained, each having the desired characteristics, and
4. The desired fraction is extracted.

It will be understood that only a part or all of a single egg yolk may be employed in step 3, or several egg yolks prepared by steps 1 and 2 may be blended together and then the combined egg yolk material employed in the centrifugation step 3.

When sufficient centrifugal force has been exerted upon the egg yolk material, for the required time interval and under certain temperature conditions, the fractionated material will be produced as three discernable layers and those fractions ($F_1$, $F_2$ and $F_3$) will have the following characteristics:

|  | Unfractionated Egg Yolk Material | $F_1$ | $F_2$ | $F_3$ |
| --- | --- | --- | --- | --- |
| Cholesterol (mg. per gr. of sample) | 9.9 | 9.7 | 6.9 | 28 |
| Fat (per cent of total weight of fraction being measured) | 36.9 | 41.59 | 34.37 | 23.30 |
| Protein (per cent of total weight of fraction being measured) | 17.55 | 13.36 | 20.02 | 26.33 |

PREPARATION OF THE YOLK FOR CENTRIFUGATION

Eggs of Single Comb White Leghorns were obtained. These birds had been on a standard commercial diet. The eggs were broken out and the albumen was separated from the yolk. Adhering albumen was removed by rolling the yolks on tissue paper. The yolks from approximately three dozen eggs were pooled in a large beaker and stirred well.

The pooled yolk was centrifuged in a conventional ultracentrifuge, at 60,000 x g for 24 hours at 0°C. The separation of the three fractions was determined visually, and the noted fractions were identified as follows:

| Fraction Identification | | | |
| --- | --- | --- | --- |
|  | $F_1$ | $F_2$ | $F_3$ |
| Appearance | Bright yellow, Translucent | Paler yellow, Opaque | Gummy Opaque |
| % of total material |  |  |  |
| Weight | 45% | 47% | 8% |
| Volume | 47.8% | 41.7% | 10.5% |
| Other | Feel of being quite high in Fat. Easily pipetted | Easily pipetted | Cannot be easily pipetted. |

Ultracentrifugation of egg yolk material has been accomplished in the past for purposes of laboratory analysis but the amount of centrifugal force, time and temperature were not selected such as would produce fractions having the characteristics according to this invention. Examples of such ultracentrifugation are described in Vandegaer, et al 62 Arch. Biochem. Bio. Phys. 328–337 (1956); Schjeide, et al 124 Science 1242–1244 (1956); and Seideman et al 48 Poultry Science 884–894 (1969).

Blended safflower oil and egg yolk material has been centrifuged at low force and short time for the purpose of separating the oil from the egg yolk material (see U.S. Pat. No. 3,717,474 issued Feb. 20, 1973 to Fioriti, et al) but such a process does not produce fractionation according to this invention.

FAT CONTENT

Each egg yolk fraction fat content was determined by placing a 2 gm sample in a thimble and freeze drying it. Forty ml of chloroform-methanol (2:1) was poured into a weighed beaker and placed under the thimble containing the sample while in a conventional extraction apparatus. After extraction for 10 hours, the solvent was evaporated from the beaker and a final weight was recorded. Per cent crude fat was calculated by dividing the weight of the fat extracted by the original sample weight and multiplying by 100.

PROTEIN CONTENT

Each egg yolk fraction protein content was determined using the method described in "Methods of Analysis (Tenth Edition)" published by the Association of Official Agricultural Chemists, Washington, D.C.

EMULSIFYING CAPACITY

The emulsifying capacity of each fraction and a whole yolk control was determined. Two gm of the desired fraction was weighed into a blender jar. To this was added 10 ml of water and 40 ml of oil. This mixture was blended for 15 sec. at medium speed on a conventional blender. After the 15 seconds blending additional oil was added very gradually to the mixture with the blender running. The addition of oil was stopped when the emulsion was visibly broken. The amount of oil added was determined and reported as ml of oil emulsified per gm of protein and ml of oil emulsified per gm of sample.

|  | Whole Egg Yolk | $F_1$ | $F_2$ | $F_3$ |
|---|---|---|---|---|
| ml Oil emulsified per gm of Protein (Wet basis) | 210.8 | 296.7 | 169.8 | * |
| ml Oil emulsified per gm of Sample (Wet basis) | 37.0 | 39.65 | 34.00 | * |

*Emulsion never existed.

CHOLESTEROL DETERMINATION IN EGGS OF VARIOUS SPECIES

Cholesterol in eggs of various avian species was determined; these were: chicken (*Gallus gallus*), domestic turkey (*Meleagris gallopavo*), wild turkey (*Meleagris gallopavo* silverstris) Ringneck Pheasant (*Phasianuf colchicuf* torquatuf), Hungarian partridge (*Perdix perdix*), and Bobwhite Quail (*Colinus virginianuf* virginianuf). The data presented above under the heading "Background of the Invention" represent an average of 8 eggs of each species.

SAMPLE PREPARATION

Eggs were broken out, separated and the albumen was discarded. The yolks were rolled on tissue paper to remove adhering albumen, placed in individual containers and held frozen (−26°C) until time of analysis. The yolks were thawed at room temperature and stirred well with a spatula. Five gm of yolk was weighed into a beaker (if any yolk did not weigh at least 5 gm the total available was accurately weighed and recorded). Fat from the 5 gm of yolk was extracted with 40 ml of chloroform: methanol mixture (2:1) for 4 hours. The extract was filtered through Whatman number 40 filter paper which was pre-moistened with the extraction mixture. The sediment was washed repeatedly with cholorform: methanol, about 5–10 ml for each washing, and the volume was made to 100 ml with the extraction mixture.

SEPARATION OF THE NEUTRAL LIPIDS BY THIN LAYER PLATE CHROMATOGRAPHY

Thin layer preparation.

Thirty gm of silica gel-G was suspended in 60 ml of distilled water. The slurry was spread on precleaned 8 by 8 inch glass plates at a thickness of 0.25 mm using a conventional spreader. The plates were air dried at room temperature for 24 hours and activated at 110°C for 1 hour. The activated plates were stored in a desiccator at room temperature.

SAMPLE APPLICATION

The split plate technique was used. The technique involved the division of the plate into two portions, one sample band for spraying and visualization, ten sample bands for quantitation, 20 μl of the extracted was spotted directly on the plate, 2 cm from the edge of the plate. The samples were applied in duplicate and a total of 11 spots were applied to each plate. Ten of the spots were for quantification and one (at the edge of the plate) was for visualization.

CHROMATOGRAM DEVELOPMENT

Chromatograms were developed twice with the same solvent at different concentrations, hexane, diethyl ether, acetic acid (91.5:7.5:1.0 v/v) A, and (84:15:1 v/v) B, respectively. The plates were first developed with A. The solvent was driven off by placing in a 110°C oven for 2 minutes. The plates were then developed in solvent B. In each case the solvent front moved 15 cm.

SPOT VISUALIZATION

All but one spot on the plate were covered with a clean plate and the uncovered spot was sprayed with 50% sulfuric acid. The plate was placed in a 110°C oven for 5 minutes. This caused the cholesterol and cholesterol esters to turn pink to violet while the triglycerides turned brown. The portions corresponding to the cholesterol and the cholesterol ester fractions of each spot were scraped from the plates and combined into individual vials.

TOTAL CHOLESTEROL DETERMINATION

Ten ml of chlorform was added to each vial; the vials were capped and left to stand for 2 hours. The supernatant was recovered by centrifugation in a clinical centrifuge at 1,000 r.p.m. for 5 minutes. Two, 3 ml aliquots were placed into test tubes and the solvent was removed by flusing with nitrogen gas. Cholesterol was determined by the method described by Rudel et al 14 (3) J. Lipid Res. 364–366 (1973). To each tube was added 2 ml of o-phthaldehyde reagent (5 mg o-phthaldehyde with enough glacial acetic acid to give 1000 ml). After 10 minutes 1 ml of concentrated sulfuric acid was added very gradually. The tube was mixed again. The optical density was determined at 550 mm after 15 minutes with a conventional spectrophotometer (conversion factor: OD/.0125 $\mp$ mg cholesterol).

All glassware for the cholesterol determination was washed in 30% HCl (technical grade) to eliminate the possibility of residual phosphate from the wash water interfering with the color development of the assay.

The following table shows the cholesterol data:

|  | Unfractionated Egg Yolk | $F_1$ | $F_2$ | $F_3$ |
|---|---|---|---|---|
| mg per gram of sample | 9.9 | 9.7 | 6.9 | 28.0 |
| Cholesterol weight as a percentage of that contained in unfractured yolk | 100.0 | 44.0 | 33.0 | 23.0 |

SPONGE CAKE EXAMPLE

Recipe

| | | |
|---|---|---|
| 64.0 gm | — | whole egg |
| 44.7 gm | — | granulated sugar |
| 25.7 gm | — | cake flour |
| 0.3 gm | — | cream of tartar |

Procedure

1. Allow the whole egg to reach room temperature (25°C) before attempting to whip.
2. Sift the sugar on the egg and whip at a relatively slow speed in a conventional mixer for approximately 15 seconds or until the sugar has been dispersed throughout the egg.
3. Increase the speed until a soft medium peak is reached, (4 minutes).
4. Incorporate the sifted flour in four equal amounts, blend with a wire whip, using about 10 strokes.
5. Weigh 80 gm of batter into a rectangular loaf pan.
6. Using a sharp instrument, i.e., spatula, cut the batter several times to spread uniformly and to remove any large air or gas pockets.
7. Bake in a pre-heated oven at 177°C for 21 minutes.
8. Remove cake, invert and allow to cool.
9. Measure the cake volume, using the seed displacement method.

When the cakes had cooled to room temperature, the volume of each was determined by rape seed displacement. Rape seeds were placed on top of the cake until the pan was full. The seeds were leveled off and the volume was determined with a 500 ml graduated cylinder.

After the volume was determined the cakes were sliced into 1–2 cm pieces and an organoleptic evaluation was performed. The cakes were evaluated for texture, tenderness, and general eating quality by 8 panelists. A standard hedonic scale with a range of 1–10 was used, with 10 being most desirable.

For the study of culinary properties of $F_1$ and $F_2$ 65% albumen was added to 35% of the yolk fraction. The albumen used was that separated from the yolk before fractionation. The control yolk was a portion of the pooled yolk before the yolk was fractionated.

Liquid whole egg is very important as an ingredient used by the baking industry. If $F_2$ mixed with albumen could entrap a sufficient amount of air to give good volume and form a fine, tender mixture in cake it might very well be put to use in the baking industry to manufacture foods lower in cholesterol. Sponge cakes were made from egg mix containing yolk fractions blended with albumen in the weight ratio 35:65 as noted above. The following table shows that there is no significant difference in the volume of sponge cakes made from $F_1$, $F_2$ and a whole yolk control.

| Influence on Cake Volume as Measured by Rape Seed Displacement | |
|---|---|
| Fraction | ml of seed |
| $F_1$ | 185.3 |
| $F_2$ | 159.0 |
| Control | 145.5 |

The data presented in the following table indicate that with respect to tenderness and general eating quality, $F_1$, $F_2$ and the control are not significantly different. However, in the case of texture, the data show that the control and $F_2$ are significantly better than $F_1$, but the control and $F_2$ are not significantly different from each other. Texture of the cake made with $F_1$ was more open than $F_2$ or the control.

TASTE PANEL EVALUATION FOR SPONGE CAKES

| Fraction | Texture Mean | Tenderness Mean | General Eating Quality Mean |
|---|---|---|---|
| $F_2$ | 6.87 | 6.62 | 6.75 |
| Control | 6.70 | 7.00 | 6.95 |
| $F_1$ | 5.70 | 6.45 | 6.54 |

It is clear from the data that at least as far as the organoleptic evaluation of sponge cakes in concerned, $F_2$ could be used to replace a whole yolk control without significantly affecting the quality of the cakes. These data along with those concerning emulsifying capacity seem to point towards the conclusion that with regard to sponge cakes, and possibly other products where the ability to hold air and a good texture is important, it would be feasible to use the low cholesterol $F_2$ in place of a whole yolk as an ingredient.

CUSTARD

Custard was made according to a standard recipe.
96 gm egg
50 gm sugar
488 gm milk Sugar and egg were mixed well with a wire whip. Heated whole milk (98°C) was added to the sugar and egg mixture and mixed well. Seventy five gm of the above custard mix was weighed into matched custard cups (top diameter 6.5 cm, bottom diameter 4.5 cm). The custards were baked in about 3 cm of boiling water in a 171°C oven for 30 to 35 minutes. The custards

MINERAL COMPOSITION OF THE FRACTIONS AND CONTROL

| | % By Weight | | | Concentration In Parts Per Million | | | | | | |
|---|---|---|---|---|---|---|---|---|---|---|
| | P | Ca | K | Na | Zn | Mn | Fe | Cu | B | Al |
| $F_1$ | .568 | .107 | .100 | 435.7 | 14.1 | 3.2 | 19.7 | 10.5 | 2.3 | 221.4 |
| $F_2$ | .731 | .231 | .182 | 435.7 | 60.9 | 4.4 | 72.2 | 8.0 | 2.8 | 203.1 |
| $F_3$ | .500 | .263 | .166 | 421.1 | 63.5 | 4.2 | 78.9 | 10.2 | 2.1 | 204.2 |
| C | .697 | .172 | .164 | 381.4 | 41.8 | 3.5 | 57.5 | 11.6 | 2.1 | 163.9 | were allowed to cool to room temperature and then were placed in a cold room (0°–3°) overnight. The gel strength of the custards was evaluated at room temperature with a conventional penetrometer fitted with a flat disc (8cm diameter). The custards were inverted onto a petri dish (9 cm diameter) and the flat disc was brought just into contact with the surface of the custard. The penetrometer was released for 10 seconds and the distance the disc travelled was recorded.

| Evaluation of Custard Gel Strength Using a Penetrometer | |
|---|---|
| Fraction | Distance Mean (mm) |
| $F_1$ | 131.2 |
| Control | 146.4 |
| $F_2$ | 154.4 |

The data show that $F_1$ makes a significantly firmer custard than $F_2$ and the control, which were not significantly different with regard to firmness. It has been suggested that the structure of the fat may be involved in determining the gel strength of custards (see Zabik, 22 Food Tech. 1465–1469, 1968). In this study also the gel strength of custards roughly followed the amount of fat in the fraction.

Liquid egg is used in many commercial products such as cakes, mayonnaise, salad dressing, etc., and it is important that the functional properties of the egg be uniform from batch to batch. Therefore, a new product, such as low cholesterol liquid egg, has to be proven functionally equivalent to whole egg to be accepted. To the consumer, however, the functionality of the product is no more important than the nutritional aspects of the product. With the current concern about nutrition and the wholesomeness of foods it was considered appropriate to examine at least a few of the nutritional properties of the low cholesterol yolk fraction.

Along with the amount of protein and fat in the yolk, the mineral concentration supplied by the egg is important nutritionally.

ASHING FOR MINERAL ANALYSIS

Ceramic crucibles were washed in a 30% solution in deionized distilled water and rinsed with deionized distilled water. The crucibles were then heated in a muffle furnace to 2000°C for 2 hours to remove any contaminants. Five gm of each sample were accurately weighed into tared crucibles. The samples were dried at 100°C for 5 to 6 hours. To each dried sample was added 2 ml of 33% $MgCl_2\text{-}12H_2O$ to retard foaming during ashing. The ashing was carried out at 550°C for 15 to 20 hours.

The mineral composition of each fraction and a whole yolk control was carried out in the ash. The mineral analysis determinations were done with a conventional emission spectrograph.

As noted above, it was necessary for ashing to perform mineral analysis that $MgCl_2$ be added to retard foaming, certain of the data above should be analyzed with this in mind.

$F_1$ is considerably lower in zinc, manganese and iron than both $F_2$ and the control. This may be due to an association of various minerals with different protein fractions or their subunits.

The data seem to indicate that at least with regard to important minerals examined, $F_2$ could be adequately substituted for the control.

Since $F_2$ is lower in cholesterol and has many comparable functional properties compared to the whole yolk, it was undertaken to determine the location of the cholesterol in the yolk. For this purpose, the various yolk fractions obtained by centrifugation were applied to a carboxymethyl cellulose column. The components of each fraction were eluted according to the method described by Seideman et al (1969). Each of the components eluted from the fraction was dialyzed against deionized distilled water to remove buffer materials. The dialyzed components were freeze dried and stored. Each of the freeze dried components was analyzed for protein, cholesterol, carbohydrate, and minerals.

$F_1$, $F_2$, and $F_3$ were resolved into 3, 5, and 5 peaks, respectively, as indicated in the following table:

PROTEIN, CHOLESTEROL AND CARBOHYDRATE COMPOSITION OF FREEZE-DRIED CHROMATOGRAPHED FRACTIONS

| Component | | % Protein | mg Cholesterol/ g sample | mg dextrose/ mg protein |
|---|---|---|---|---|
| $F_1$ | $P_1$ | 16.6 | 19.9 | 75.4 |
| | $P_2$ | 15.1 | 31.8 | 124.2 |
| | $P_3$ | 17.4 | 3.4 | 121.4 |
| $F_2$* | $P_1$ | 34.4 | 27.5 | 363.6 |
| | $P_3$ | 12.6 | 8.8 | 36.1 |
| | $P_4$ | 10.5 | 16.0 | 97.6 |
| | $P_5$ | 43.2 | <1.0 | 40.3 |
| $F_3$ | $P_1$ | 36.3 | 27.2 | 69.9 |
| | $P_2$ | 19.4 | 25.8 | 60.7 |
| | $P_3$ | 27.3 | 36.0 | 18.0 |
| | $P_4$ | 33.9 | 11.8 | 45.2 |
| | $P_5$ | 43.6 | <1.0 | 3.5 |

*not enough material to do analysis on $F_2P_2$

Although the method of Seideman et al (1969) was followed, the patterns of elution for $F_1$, $F_2$, and $F_3$ did not quite correspond to their observations. Seideman et al cited above, reported the sequence of elution of yolk components as $\alpha$-, $\beta$-, and $\gamma$-livetins in the first peak followed by phosvitin, lipovitellin and phosvitin, phospholipids, and inorganic phosphorus. The present findings suggest that there may be some reorganization of the yolk components during centrifugation. The data indicate that the components of $F_1$ are generally lower in protein compared to $F_2$ and $F_3$. The mineral analysis shows that qualitatively the minerals seem to be relatively evenly distributed among the components. However, the mineral data for $F_1P_3$ seem to be out of line with the mineral data of other fractions. At this time no explanation can be offered to account for this. It might be pointed out that, with respect to phosphorus, $F_3$ seems to be a little richer than the other two fractions. Powrie (1973) reported that the yolk granule (sediment on centrifugation) contains 16% phosvitin. Phosvitin is a non-lipid phosphoprotein. The data also show that $F_3$ is richer in protein and contains less fat than the other two fractions. These data tend to indicate that $F_3$ is richer in phosvitin that the other two fractions.

The protein, cholesterol, and carbohydrate data also do not seem to indicate any obvious relationship between cholesterol and the various components eluted. With the exception of $F_2P_5$ and $F_3P_5$ cholesterol is associated with all the eluted materials off the column.

The $F_2$ fraction is not only useful in such food products as cakes and custards as above noted but is also useful in many other food products.

The $F_1$ and $F_3$ fractions are also useful in a variety of food products and particularly such products as mayonnaise, ice cream, etc.

Much of the above precise data was produced by computing the mean of all data derived from many meaningful tests. Obviously, this invention can be practiced in which the characteristics of the egg yolk fractions fall within certain ranges of values. Investigations were conducted to specify the range of major characteristics:

|  | Control | $F_1$ | $F_2$ | $F_3$ |
|---|---|---|---|---|
| Volume of fraction as a percentage of unfractured yolk | — | 45–50 | 37–43 | 8–13 |
| Protein as a percentage of the total weight of the fraction measured | 16–18 | 11–15 | 19–21 | 22–28 |
| Fat as a percentage of the total weight of the fraction measured | 29–37 | 38–44 | 30–36 | 19–26 |
| Cholesterol — mg/gram | 9–13 | 9–12.5 | 6–9 | 26–30 |

Although fractionation was produced with a specific value of centrifugal force, for a certain time and a given temperature, as above noted, the value for each of those factors may be varied to produce fractions in accordance with this invention.

What is claimed is:

1. An egg yolk having been separated into three fractions, the first fraction ($F_1$) comprising about 47% of the volume of the total egg yolk, the second fraction ($F_2$) comprising about 42% of the volume of the total egg yolk, and the third fraction ($F_3$) comprising about 11% of the volume of the total egg yolk, wherein the distribution of fat, protein, and cholesterol in the fractions is about:

| Fraction | % of Total Fat (weight) | % Total Protein (weight) | % of Total Cholesterol (weight) |
|---|---|---|---|
| $F_1$ | 50.7 | 33.8 | 44.0 |
| $F_2$ | 43.9 | 53.4 | 33.0 |
| $F_3$ | 5.3 | 12.6 | 23.0. |

2. The method of fractionation of egg yolks which comprises the steps of:
   1. Breaking the shell,
   2. Separating the yolk from the albumen,
   3. Centrifuging the yolk to thereby cause the yolk to separate into three distinct fractions having distribution of fat, protein and cholesterol as defined in claim 1, and
   4. Recovering the fractions.

3. An egg yolk having been separated into three fractions $F_1$, $F_2$ and $F_3$ each of which is characterized by the following composition.

|  | $F_1$ | $F_2$ | $F_3$ |
|---|---|---|---|
| Cholesterol — mg/gm | 9–12.5 | 6–9 | 26–30 |
| Protein as a percentage of the total weight of the fraction measured | 11–15 | 19–21 | 22–28 |
| Fat as a percentage of the total weight of the fraction measured | 38–44 | 30–36 | 19–26. |

4. The method of preparing egg yolk fractions as defined in claim 3 which includes the steps of:
   1. Breaking the shell,
   2. Separating the yolk from the albumen,
   3. Centrifuging the yolk to thereby cause fractionation into three distinct fractions having the required characteristics, and
   4. Recovering the fractions.

* * * * *